US012308199B2

(12) United States Patent
Kruse

(10) Patent No.: US 12,308,199 B2
(45) Date of Patent: May 20, 2025

(54) X-RAY CATHODE FOCUSING ELEMENT

(71) Applicant: GE Precision Healthcare LLC, Wauwatosa, WI (US)

(72) Inventor: Kevin S. Kruse, Muskego, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 615 days.

(21) Appl. No.: 17/654,046

(22) Filed: Mar. 8, 2022

(65) Prior Publication Data

US 2023/0290603 A1 Sep. 14, 2023

(51) Int. Cl.
*H01J 35/06* (2006.01)
*H01J 1/90* (2006.01)

(52) U.S. Cl.
CPC .......... *H01J 35/066* (2019.05); *H01J 35/064* (2019.05); *H01J 1/90* (2013.01)

(58) Field of Classification Search
CPC ........ H01J 35/066; H01J 35/064; H01J 35/14; H01J 1/90
See application file for complete search history.

(56) References Cited

U.S. PATENT DOCUMENTS 4,458,180 A 7/1984 Sohval et al.
7,020,244 B1 3/2006 Wilson et al.
7,828,621 B2 11/2010 Lemaitre
2001/0014139 A1* 8/2001 Price ..................... H01J 35/107 378/144
2002/0063500 A1* 5/2002 Keren ..................... H01J 35/32 313/30
2004/0114724 A1* 6/2004 Subraya ................. H05G 1/025 378/141
2013/0266119 A1* 10/2013 Taniguchi ............... H01J 35/14 378/111
2014/0029725 A1* 1/2014 Ueda .................... A61B 6/4488 378/62

FOREIGN PATENT DOCUMENTS

CN 101128081 A 2/2008
EP 3475967 B1 11/2020
JP S55133562 U 9/1980
KR 20200022994 A 3/2020

OTHER PUBLICATIONS

KR 2020-0022994 A and an English machine translation (Year: 2020).*
EP application 23160517.1 filed Mar. 7, 2023—Partial Search Report issued Jul. 21, 2023; 12 pages.
KR20200022994 English Abstract; retrieved from Espacenet.com, Oct. 21, 2023; 1 page.
EP application 23160517.1 filed Mar. 7, 2023—extended Search Report issued Dec. 22, 2023, 14 pages.
JPS55133562U Machine Translation, Espacenet.com Mar. 22, 2024; 3 pages.

* cited by examiner

*Primary Examiner* — Chih-Cheng Kao
(74) *Attorney, Agent, or Firm* — McCoy Russell LLP

(57) ABSTRACT

Various methods and systems are provided for a cathode of an X-ray imaging system, the cathode comprising a cup and a ceramic insulator having a convex outer surface mating with corresponding pockets on the cup surrounding the ceramic insulator.

20 Claims, 5 Drawing Sheets

X-RAY CATHODE FOCUSING ELEMENT

FIELD

Embodiments of the subject matter disclosed herein relate to a cathode for imaging systems, for example, X-ray imaging systems.

BACKGROUND

In an X-ray tube, ionizing radiation is created by accelerating electrons in a vacuum from a cathode to an anode via an electric field. The electrons originate from a filament of the cathode with current flowing therethrough. The filament may be heated by a current flowing through it to liberate electrons from the cathode and accelerate the electrons toward the anode. Additional filaments heated by currents at different voltages may be used to focus the electron beam towards the anode, and to influence the size and position of the X-ray emitting spot. The cathode may be configured with additional focusing elements, such as a focusing architecture, for example, to further influence the size and position of the X-ray emitting spot.

BRIEF DESCRIPTION

In one embodiment, a cathode for an x-ray device includes a cup and a ceramic insulator having a convex outer surface mating with corresponding pockets on the cup surrounding the ceramic insulator.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
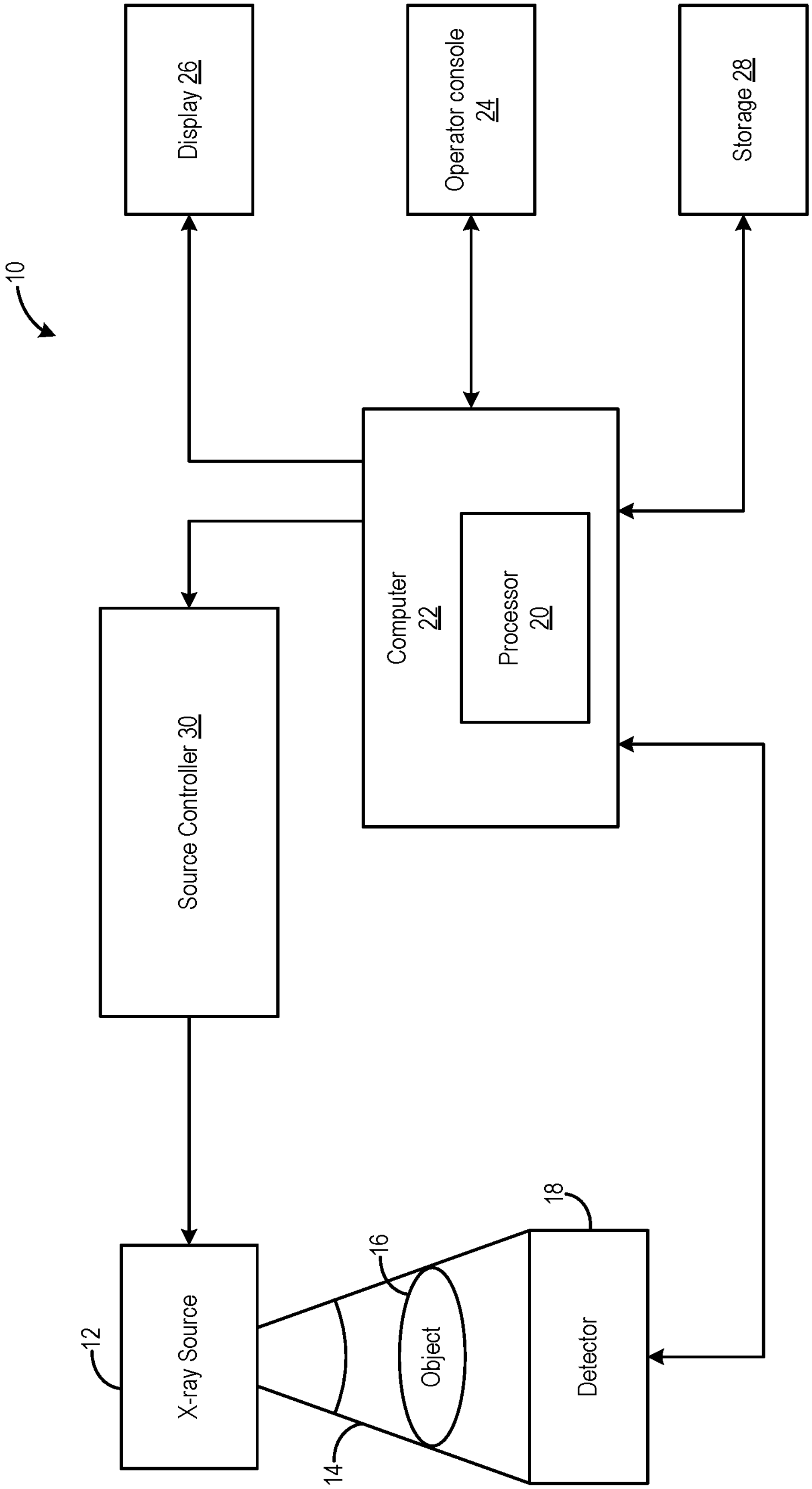
FIG. 1 shows a block diagram of an example of an imaging system.
Figure 2:
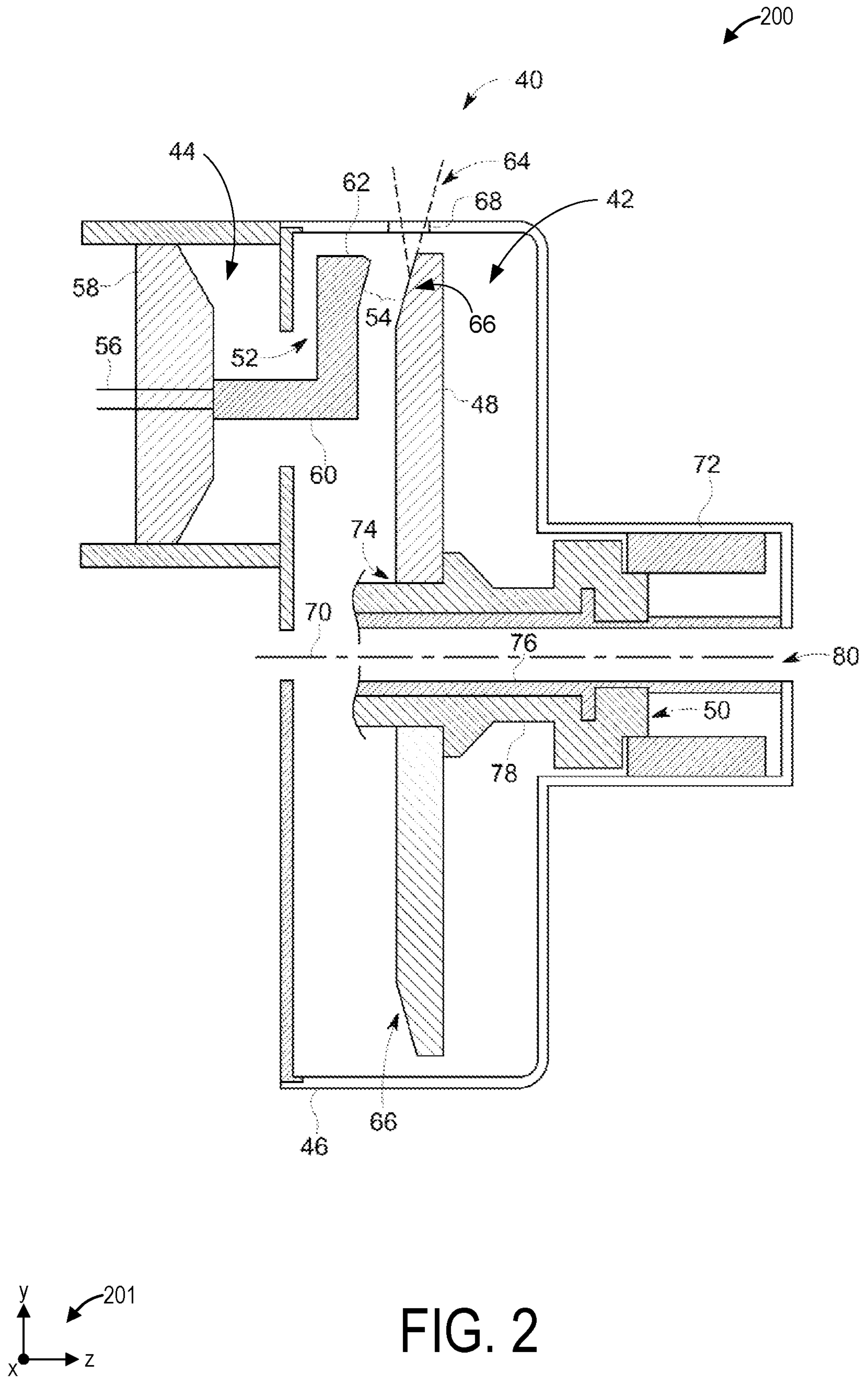
FIG. 2 shows a schematic of a cross-sectional view of a portion of an X-ray tube which may be included in the imaging system of FIG. 1.
Figure 3:
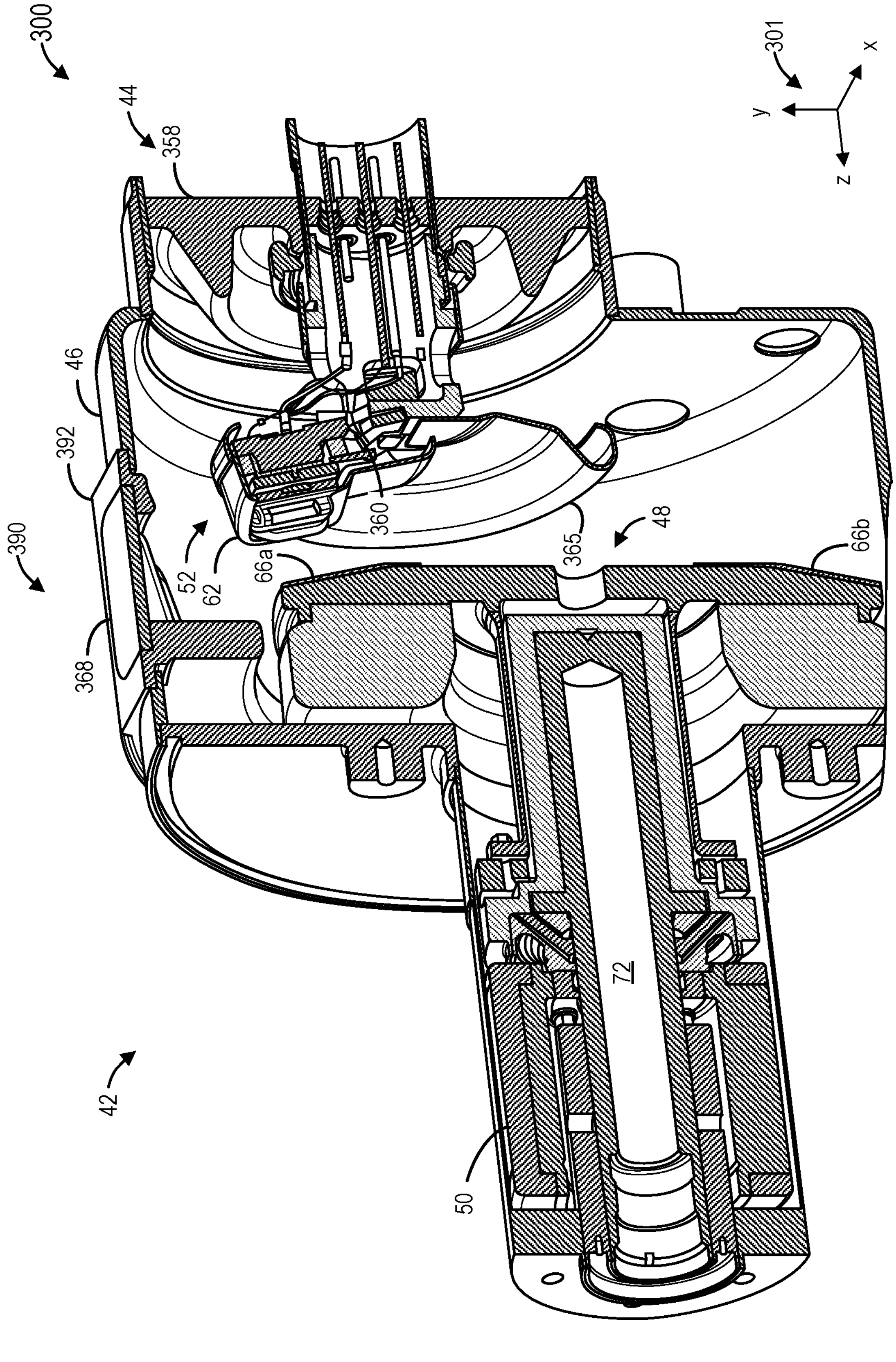
FIG. 3 shows a perspective cross-sectional view of a portion of an X-ray tube which may be included in the imaging system of FIG. 1.

The following description relates to various embodiments for a cathode of an X-ray tube. The X-ray tube may be included in an X-ray imaging system, an example block diagram of which is shown in FIG. 1. The X-ray imaging system may be an interventional radiography imaging system, a fluoroscopic imaging system, a mammography imaging system, a fixed or mobile radiography (RAD) imaging system, a tomographic imaging system, a computed tomography (CT) imaging system, and so on. The X-ray imaging system includes an X-ray source (e.g., the X-ray tube) to generate irradiating X-ray beams. A cross-sectional schematic view of an X-ray tube is shown in FIG. 2, and a cross-sectional perspective view of an X-ray tube is shown in FIG. 3. The X-ray tube of FIG. 3 may be an embodiment of the X-ray tube of FIG. 2. The X-ray tubes of FIGS. 2-3 include an anode assembly and a cathode assembly, the latter of which includes a cathode, as is shown in further detail in FIGS. 4-5.

Figure 4:
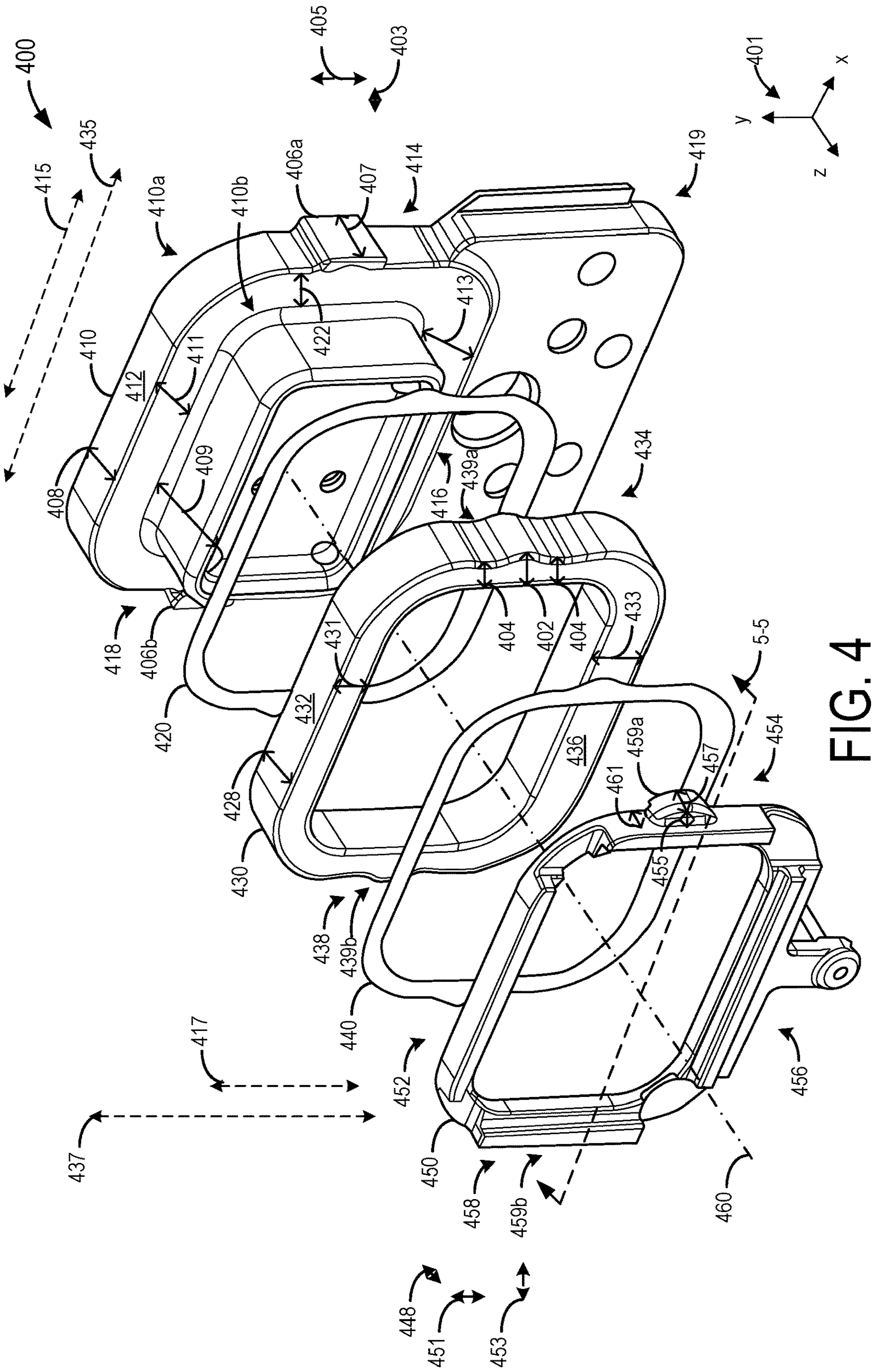
FIG. 4 shows an exploded view of a cathode which may be included in the X-ray system tube of FIG. 2.
Figure 5:
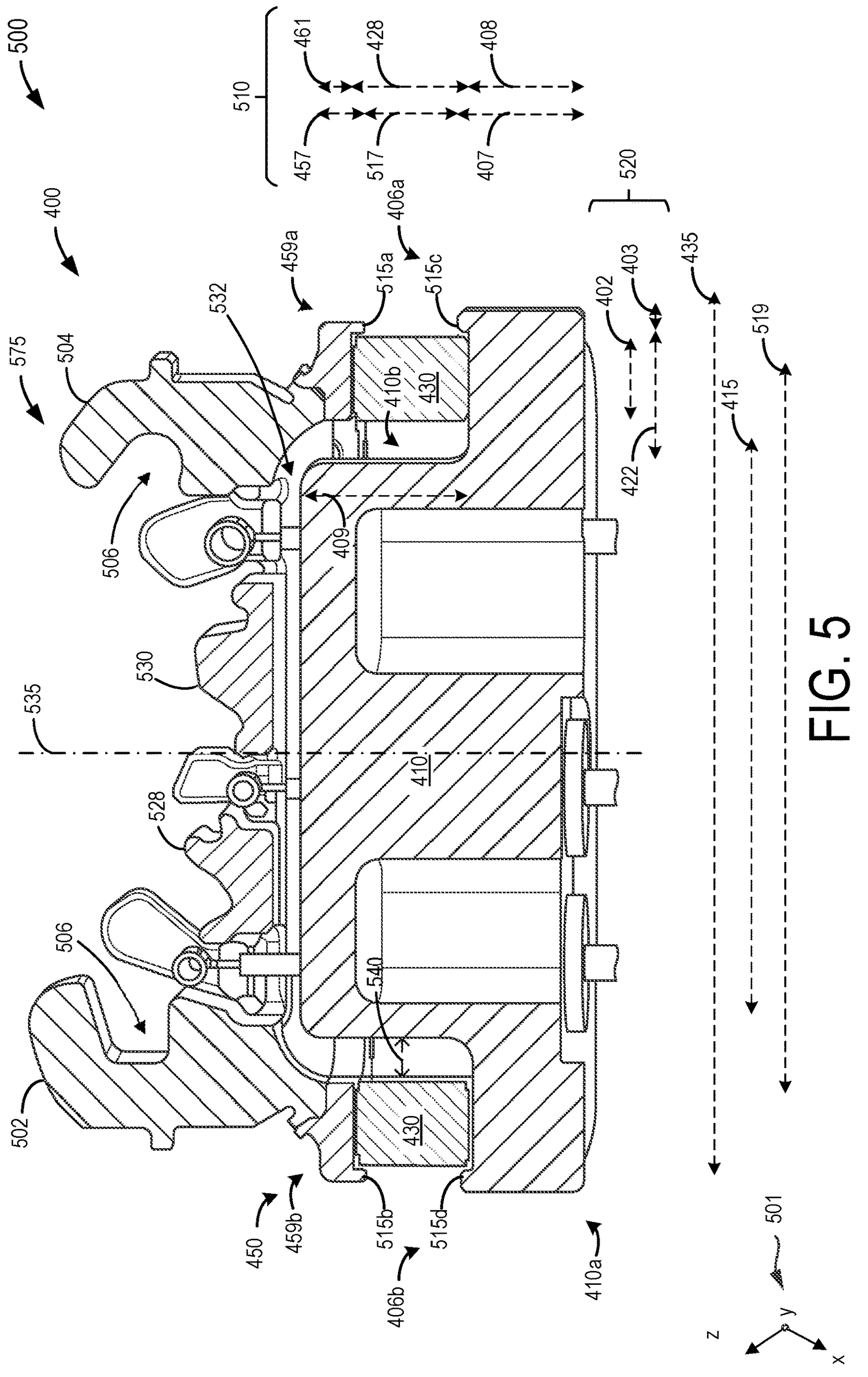
FIG. 5 shows a cross-sectional view of the cathode of FIG. 3.

FIG. 4 shows an exploded view of the cathode, including a ceramic insulator, braze foils, a base, and a weld pad (collectively, the cathode elements). Each of the aforementioned cathode elements may include integrated localizing features which may be used to align and assemble the cathode elements. FIG. 5 shows a cross-sectional view of the cathode including details of integrated localizing features of the ceramic insulator, the base, and the weld pad. FIGS. 2-5 are shown approximately to scale although other relative dimensions may be used.

Smart cathodes may be used in imaging systems, such as X-ray imaging systems, to provide focusing to coiled filaments and create essentially infinite focal spot shape sizes with electrode features. Smart cathodes may be manufactured by brazing together at least two base elements, where at least two base elements are joined using a filler metal with an insulator positioned therebetween. Features which provide focusing for the electrode may be machined on the brazed elements, for example, using electrical discharge machining (EDM) at an assembly level. EDM may allow for multiple feature geometries with linear shapes (e.g., where planes of the geometries intersect at angles rather than curved geometries). Following EDM to create feature geometries, the resulting smart cathode may be cleaned. For example, surfaces of the smart cathode may be grit blasted to remove braze overflow and recast layers from the EDM process.

In one example, the insulator positioned between the at least two base elements may be formed of ceramic or other sufficient insulating material. A conventional ceramic insulator may include locating holes and/or cutouts for locating dowels to assist in positioning the ceramic insulator, the at least two base elements, and the filler metal. The at least two base elements may conventionally include locating dowels (e.g., when the ceramic insulator includes cutouts for locating dowels) to provide integral fixturing for the cathode, and may further include holes for pressfit operations used to mate (e.g., braze together) metal base elements.

However, challenges exist with conventional smart cathode systems. For example, the locating holes and cutouts for locating dowels of the ceramic insulator may be stress concentration points. As the smart cathode is used, stress at the locating holes may result in cracking of the cathode, which may render the smart cathode unusable. Further, the at least two base elements may include excessive braze overflow at the locating dowels, which may reduce insulating ability of the ceramic insulator due to excess metal at the locating dowels.

The smart cathode may be unusable due to cracks because, as the ceramic acts as an insulator between at least two cup elements, such as a base and a weld pad (e.g., upon which a focusing element is positioned), a first voltage applied to the weld pad may no longer be insulated from a second voltage applied to the base, and vice versa. Further, the locating dowels may include excessive braze overflow from braze machining which may not have been removed during cleaning of the smart cathode (e.g., via grit blasting). During manufacturing, when mating metal parts of the smart cathode, holes in the base and/or the weld pad which are used for pressfit operation may also be stress concentration points.

A system may thus be desired for a smart cathode with architecture which decreases a number of stress concentration points relative to conventional design. In one example, the architecture may provide tight tolerance location without locating dowels and/or ceramic features which conventionally result in high stress concentration points.

In one embodiment, the design includes convex surfaces integrated as part of a unitary, single member insulator ceramic. The convex surfaces may be curves which are formed as part of the insulator ceramic surface, and may sit in concave pockets on the surrounding cup assembly features. For example, the concave pockets are formed by vertically protruding features of the base and the weld pad. Fitting the insulator ceramic between the base and the weld pad using integrated concave and convex features as opposed to locating dowels, cutouts for locating dowels, and locating holes may provide a tight tolerance stack for the cathode. Further, the exclusion of locating dowels may allow for less material to be removed during post braze EDM machining. High stress concentration features in the ceramic insulator may thus be removed and dimensional locating of cathode elements (e.g., the base, the insulator, braze foils, and the weld pad) is provided by integral convex features in ceramic and concave features in metal parts (e.g., the base and the weld pad). In one of a variety of embodiments, the herein described system architecture may reduce stress in areas where cracks occur in conventional cathodes by approximately 50%.

Thus, conventionally used locating dowels, which use additional parts and operations compared to the herein described system for a smart cathode, may be eliminated from the smart cathode design. The herein disclosed system further provides accurate alignment of cathode elements using the integral features. The dowel locating features are replaced by locating features integral to the cathode ceramic which may reduce stress concentration points. Creating integral features (e.g., self-fixtures) may reduce locating fixtures brazing to the metal parts when the locating fixtures are separate Eliminating locating dowels (on the metal components) and corresponding ceramic features may eliminate braze cracking and reduce braze overflow.

Technical advantages of the herein disclosed system for a smart cathode include increased smart cathode voltage stability. Insulation of voltage among metal pieces (e.g., the at least two base elements) may be increased by preventing ceramic cracking and reducing braze overflow. Commercial advantages may include reduced machining time and corresponding complexity of individual parts (e.g., due to removal of locating dowels and associated machining procedures).

Before further discussion of the smart cathode system with integrated locating features, an example imaging system in which the cathode may be implemented is shown. Turning now to FIG. 1, a block diagram is shown of an embodiment of an imaging system 10 configured both to acquire original image data and to process the image data for display and/or analysis in accordance with exemplary embodiments. It will be appreciated that various embodiments are applicable to numerous X-ray imaging systems implementing an X-ray tube, such as X-ray radiography (RAD) imaging systems, X-ray mammography imaging systems, fluoroscopic imaging systems, tomographic imaging systems, or CT imaging systems. The following discussion of the imaging system 10 is merely an example of one such implementation and is not intended to be limiting in terms of modality.

As shown in FIG. 1, imaging system 10 includes an X-ray tube or X-ray source 12 configured to project a beam of X-rays 14 through an object 16. The object 16 may include a human subject, pieces of baggage, or other objects desired to be scanned. The X-ray source 12 may be conventional X-ray tubes producing X-rays 14 having a spectrum of energies that range, typically, from thirty (30) keV to two hundred (200) keV. The X-rays 14 pass through the object 16 and, after being attenuated, impinge upon a detector assembly 18. Each detector module in the detector assembly 18 produces an analog electrical signal that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CdTe, CZT, Si detectors, etc.) may also be implemented.

A processor 20 receives the signals from the detector assembly 18 and generates an image corresponding to the object 16 being scanned. A computer 22 communicates with the processor 20 to enable an operator, using an operator console 24, to control the scanning parameters and to view the generated image. That is, the operator console 24 includes some form of operator interface, such as a keyboard, mouse, voice activated controller, or any other suitable input apparatus that allows an operator to control the imaging system 10 and view the reconstructed image or other data from the computer 22 on a display unit 26. Additionally, the operator console 24 allows an operator to store the generated image in a storage device 28 which may include hard drives, floppy discs, compact discs, etc. The operator may also use the operator console 24 to provide commands and instructions to the computer 22 for controlling a source controller 30 that provides power and timing signals to the X-ray source 12.

FIG. 2 illustrates a cross-sectional schematic view of an X-ray source 200 which may be included in the imaging system of FIG. 1. For example, the X-ray source 200 may be an exemplary embodiment of the X-ray source 12 of FIG. 1, formed of an X-ray tube 40 that includes an anode assembly 42 and a cathode assembly 44. A set of reference axes 201 are provided for comparison between views shown, indicating an x-axis, a y-axis, and a z-axis. The X-ray tube 40 is supported by the anode assembly 42 and cathode assembly 44 within an envelope or frame 46, which houses an anode 48 with a target 66, a bearing assembly 50, and a cathode 52. The frame 46 defines an area of relatively low pressure (e.g., a vacuum) compared to ambient, in which high voltages may be present. Further, the frame 46 may be positioned within a casing (not shown) filled with a cooling medium, such as oil, that may also provide high voltage insulation. While the anode 48 configured with the target 66 is described above as being a common component of the X-ray tube 40, the anode 48 and target 66 may be separate components in alternative X-ray tube embodiments.

In operation, an electron beam is produced by the cathode assembly 44. In particular, the cathode 52 receives one or more electrical signals via a series of electrical leads 56. The electrical beam occupies a space 54 between the cathode 52 and the target 66 of the anode 48. The electrical signals may be timing/control signals that cause the cathode 52 to emit the electron beam at one or more energies and at one or more frequencies. The electrical signals may also at least partially control the potential between the cathode 52 and the anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a filament within cathode cup 62 to form the electron beam.

X-rays 64 are produced when high-speed electrons of the electron beam are suddenly decelerated when directed from the cathode 52 to the target 66 formed on the anode 48 via a potential difference therebetween of, for example, sixty thousand (60,000) volts or more in the case of CT applications. The X-rays 64 are emitted through a radiation emission passage 68 formed in the frame 46 toward a detector array, such as the detector assembly 18 of FIG. 1.

Anode assembly 42 includes a rotor 72 and a stator (not shown) located outside the X-ray tube 40 and surrounding the rotor 72 for causing rotation of the anode 48 during operation. The anode 48 is supported for rotation by a bearing assembly 50, which, when rotated, also causes the anode 48 to rotate about a centerline 70 thereof. As such, the centerline 70 defines a rotational axis of the anode 48 and the bearing assembly 50. As shown, the anode 48 has an annular shape, which contains a circular opening 74 in the center thereof for receiving the bearing assembly 50.

The anode 48 may be manufactured to include a number of metals or alloys, such as tungsten, molybdenum, copper, or any material that contributes to bremsstrahlung (e.g., deceleration radiation) when bombarded with electrons. The target 66 of the anode 48 may be selected to have a relatively high refractory value so as to withstand the heat generated by electrons impacting the anode 48. Further, the space between the cathode assembly 44 and the anode 48 may be evacuated in order to minimize electron collisions with other atoms and to maximize an electric potential.

To avoid overheating of the anode 48 when bombarded by the electrons, the rotor 72 rotates the anode 48 at a high rate of speed (e.g., 90 to 250 Hz) about the centerline 70. In addition to the rotation of the anode 48 within the frame 46, in a CT application, the X-ray tube 40 as a whole is caused to rotate about an object, such as the object 16 of the imaging system 10 in FIG. 1, at rates of typically 1 Hz or faster.

Different embodiments of the bearing assembly 50 can be formed, such as with a number of suitable ball bearings, but in the illustrated exemplary embodiment comprises a liquid metal hydrodynamic bearing having adequate load-bearing capability and acceptable acoustic noise levels for operation within the imaging system 10 of FIG. 1.

In general, the bearing assembly 50 includes a stationary component, such as a center shaft 76, and a rotating portion, such as a sleeve 78 to which the anode 48 is attached. While the center shaft 76 is described with respect to FIG. 2 as the stationary component of the bearing assembly 50 and the sleeve 78 is described as the rotating component of the bearing assembly 50, embodiments of the present disclosure are also applicable to embodiments wherein the center shaft 76 is a rotary shaft and the sleeve 78 is a stationary component. In such a configuration, the anode 48 would rotate as the center shaft 76 rotates.

The center shaft 76 may optionally include a cavity or coolant flow path 80 though which a coolant (not shown), such as oil, may flow to cool bearing assembly 50. As such, the coolant enables heat generated from the anode 48 of the X-ray tube 40 to be extracted therefrom and transferred external from the X-ray tube 40. In straddle mounted X-ray tube configurations, the coolant flow path 80 extends along a longitudinal length of the X-ray tube 40, e.g., along the centerline 70. In alternative embodiments, the coolant flow path 80 may extend through only a portion of the X-ray tube 40, such as in configurations where the X-ray tube 40 is cantilevered when placed in an imaging system.

FIG. 3 illustrates a cross-sectional perspective view of an X-ray tube 300 which may be an embodiment of the X-ray tube 40 of FIG. 2. Elements of the X-ray tube 300 which are equivalent to elements of the X-ray tube 40 of FIG. 2 are similarly numbered. A set of reference axes 301 are provided for comparison between views shown, indicating an x-axis, a y-axis, and a z-axis.

The X-ray tube 300 may include the anode assembly 42 and the cathode assembly 44 shown in FIG. 2, as well as a collector assembly 390. As described above, the anode assembly 42 may generate X-rays when the target is impacted by electrons emitted from the cathode 52. The X-ray tube 300 may include a first target **66*a* and a second target 66*b*, which may be positioned on opposite ends of the anode 48. The anode 48 may be supported for rotation by the bearing assembly 50, and may be rotated by a rotor 72 and a stator, thus distributing an electron heat load on each of the first target 66*a* and the second target 66*b***.

The cathode assembly 44 may include a major insulator 358, a lower extender 360, a shield 365, and a cathode cup 62. The major insulator 358 may be equivalent to the central insulating shell 58, and the lower extender 360 may be equivalent to the mask 60. The shield 365 may shield components of the cathode 52, such as filaments and focusing elements further described in FIG. 5, from backscatter electrons. As previously described in reference to FIG. 2, the cathode assembly 44 may provide electrons to the target (e.g., the first target **66*a* and/or the second target 66*b***) at varying energy levels.

The collector assembly 390 may include an electron collector 392 and a window 368. The window 368 may be equivalent to the radiation emission passage 68 of FIG. 2, through which X-rays generated by the anode assembly 42 are emitted. The electron collector 392 may hold the window 368 in place in the frame 46 and may further absorb backscatter electrons.

As described above, a system is desired for a smart cathode, herein referred to as "cathode", with architecture which decreases a number of stress concentration points relative to conventional design, which may include locating cutouts and dowels. The herein described cathode may have increased high-voltage stability and increased useable lifetime compared to a conventional smart cathode. A cathode system described herein includes integral convex surfaces on a ceramic insulator and concave pockets formed by a base and a weld pad positioned on either side of the ceramic insulator. The integral convex surfaces may sit in the concave pockets to align elements of the cathode system (e.g., the ceramic insulator, the weld pad, the base, and braze foils used to join the aforementioned elements) The herein described system may thus result in a cathode with reduced stress points compared to conventional cathodes having locating holes and dowels. A useable life of the cathode may thus be relatively increased and manufacturing complexity may be decreased.

FIG. 4 shows an exploded view of elements of a cathode 400. In one example, the cathode 400 may be the cathode 52 of FIGS. 2-3. A set of reference axes 401 are provided for comparison between views shown, indicating an x-axis, a y-axis, and a z-axis. FIG. 4 shows some, but not all, elements of the cathode 52. For example, the cathode 52 may further include a focusing element including filaments from which electrons are emitted upon heating of the filaments (e.g., as shown in FIG. 5). The focusing element may further focus emitted electrons into an electron beam which impacts the target 66 of the anode 48 of FIG. 2.

FIG. 4 shows elements of a base assembly of the cathode 400, including a base 10, a first braze foil 420, an insulator 430, a second braze foil 440, and a weld pad 450. When the cathode 400 is assembled (e.g., as shown in FIG. 5), each of the aforementioned cathode elements may be vertically stacked, such that the first braze foil 420 may be in face sharing contact with the insulator 430 and the base 10, and the second braze foil 440 may be in face sharing contact with the insulator 430 (e.g., on a face of the insulator 430 opposite the first braze foil 420) and the weld pad 450.

In the present embodiment, the insulator 430 is a ceramic insulator (e.g., formed of ceramic). In other embodiments, the insulator 430 may be formed of material which sufficiently insulates the base 10 from the weld pad 450. The insulator 430 may have a rectangular ring shape with a hollow center. For example, the insulator 430 may have a rectangular shape with curved edges and a rectangular cutout with curved edges in a center of the insulator 430. The insulator 430 may have a first leg 432 opposite a third leg 436 and a second leg 434 opposite a fourth leg 438. The first leg 432 may have a first width 431 and the third leg 436 may have a second width 433 greater than the first width 431. The first leg 432 and the third leg 436 may have a first length 435 and the second leg 434 and the fourth leg 438 may have a second length 437, where the first length 435 is greater than the second length 437. The insulator 430 may have a first height 428, which is equivalent around a circumference of the insulator 430.

The insulator 430 may include an integral convex outer surface which may mate with corresponding pockets of a metal cup, as further described below. The convex outer surface may include a first curve 439*a* and a second curve 439*b* on the second leg 434 and the fourth leg 438, respectively. The first curve 439*a* and the second curve 439*b* may be equivalent in size, shape, and placement along a respective leg. Each of the first curve 439*a* and the second curve 439*b* may be seamlessly integrated with the second leg 434 and the fourth leg 438, respectively, where the insulator 430 is manufactured as a single piece including the first curve 439*a* and the second curve 439*b*. Details of the first curve 439*a* will be described herein for brevity, and may also be applicable to the second curve 439*b*.

The first curve 439*a* may have a unitary convex wave shape centered along the second length 437 of the second leg 434. The unitary convex wave shape may include a third width 402 at a center of the shape with a fourth width 404 on either side of the third width 402. The third width 402 may be greater than the fourth width 404, and the fourth width 404 may be less than the first width 431. Further, the third width 402 may be greater than the second width 433. Each of the third width 402 and the fourth width 404 on either side are curvedly connected, thus forming the unitary convex wave shape of the first curve 439*a*.

The cathode 400 further includes the first braze foil 420 and the second braze foil 440, which may be used to couple (e.g., via brazing) the insulator 430 to the base 10 and the weld pad 450, respectively. The first braze foil 420 and the second braze foil 440 may be ring-like structures with similar dimensions as the insulator 430. Dimensions of the first braze foil 420 and the second braze foil 440 may be equal to dimensions of the insulator 430 (e.g., the first length 435, the second length 437, the first width 431, and the second width 433). Alternatively, dimensions of the first braze foil 420 and the second braze foil 440 may be proportionally less than those of the insulator 430. For example, the first braze foil 420 and the second braze foil 440 may retain ring-like structures where a width of a first leg corresponding to the first leg 432 of the insulator 430 is less than a second width of a third leg corresponding to the third leg 436 of the insulator 430.

The first braze foil 420 and the second braze foil 440 may further include unitary convex wave shapes on a second leg and a fourth leg of the respective braze foil which, when the first braze foil 420 and the second braze foil 440 are positioned on either side of the insulator 430, are in alignment with the first curve 439*a* and the second curve 439*b*. Unitary convex wave shapes of the first braze foil 420, the second braze foil 440, and the insulator 430 may fit into a metal cup pocket formed by integrated localizing elements of the base 10 and the weld pad 450.

The base 10 may be formed of a metal such as, for example, nickel, steel, Kovar, or Niobium, and may have a continuous, stepped architecture including a first level 410*a* and a second level 410*b*. The first level 410*a* may have the first length 435 along a fifth leg 412 and a seventh leg 416, opposite the fifth leg 412. The first level 410*a* may further have the second length 437 along a sixth leg 414 and an eighth leg 418, opposite the sixth leg 414. Alternatively, dimensions of the first level 410*a* may be proportionally less than those of the insulator 430. For example, the lengths of respective legs of the first level 410*a* may be less than the first length 435 and the second length 437, while a width of a first leg corresponding to the first leg 432 of the insulator 430 is less than a second width of a third leg corresponding to the third leg 436 of the insulator 430. The first level 410*a* may have a second height 408, which may be less than or equal to the first height 428 of the insulator 430, and less than a third height 409 of the second level 410*b*. The first level 410*a* may also include a lower extension 419 along the seventh leg 416. The lower extension 419 may be equivalent to the lower extender 360 of FIG. 3, and may couple the cathode 400 to the cathode assembly 44.

The second level 410*b* may be positioned in a center of the first length 435 and off center of the second length 437, such that a fifth width 411 of the fifth leg 412 is less than a sixth width 413 of the seventh leg 416, and the sixth leg 414 and the eighth leg 418 have a seventh width 422. The seventh width 422 may be less than the fifth width 411 of the fifth leg 412 and the sixth width 413 of the seventh leg 416. The fifth width 411 may be equal to the first width 431 and the seventh width 422 may be greater than the fourth width 404 and less than the third width 402 of the insulator 430. Alternatively, the seventh width 422 may be equal to the fourth width 404. In various embodiments, the first level 410*a* may be proportionally larger than the insulator 430, such that the first level 410*a* may have the same relative leg lengths and widths described above and be larger than the insulator 430. Thus, when the insulator 430 is positioned on top of the first level 410*a*, there may be a gap between the insulator 430 and the second level 410*b*, as further described in relation to FIG. 5.

The second level 410*b* may have a third length 415 along the fifth leg 412 and the seventh leg 416, and a fourth length 417 along the sixth leg 414 and the seventh leg 416. The third length 415 may be less than the first length 435 by a sum of the seventh width 422 on either side of the second level 410*b*. The fourth length 417 may be less than the second length 437 by a sum of the fifth width 411 and the sixth width 413.

As briefly described above, the base 10 may include a pocket base with which the integral convex outer surface of the insulator 430 may mate. For example, the pocket base may be a first part of the metal cup pocket within which the unitary convex wave shapes of the first braze foil 420, the second braze foil 440, and the insulator 430 may fit. The base 10 may include a first pocket base 406*a* and a second pocket base 406*b* on the sixth leg 414 and the eighth leg 418, respectively. The first pocket base 406*a* and the second pocket base 406*b* may be equivalent in size, shape, and placement along a respective leg. Each of the first pocket base 406*a* and the second pocket base 406*b* may be seamlessly integrated with the sixth leg 414 and the eighth leg 418, respectively, where the base 10 is manufactured as a single piece including the first pocket base 406*a* and the second pocket base 406*b*. Details of the first pocket base 406*a* will be described herein for brevity, and may also be applicable to the second pocket base 406*b*.

The first pocket base 406*a* may have a unitary rectangular shape centered along the second length 437 of the sixth leg 414. The unitary rectangular shape may include an eighth width 403 for a fifth length 405. The eighth width 403 may be summed with the seventh width 422 to extend a total width of the base 10 at the first pocket base 406*a* to be greater than the seventh width 422 and greater than the third width 402. Additionally, the first pocket base 406*a* may include a lip with a fourth height 407 at an outermost leg (e.g., distal from the center of the base 10, as shown by a line 460). The lip may extend in the same direction as the second level 410*b*. The fourth height 407 may be greater than the second height 408 of the first level 410*a* of the base 10. When the first braze foil 420 and the insulator 430 are positioned on top of the base 10 (e.g., the exploded view shown in FIG. 4 is collapsed along the line 460 towards the base 10), the first curve 439*a* may rest on the first pocket base 406*a* and be partially enclosed by the lip, as further shown and described in reference to FIG. 5.

The third height 409 of the second level 410*b* may be greater than a sum of the first height 428 of the insulator 430 and heights of the first braze foil 420 and the second braze foil 440. The second level 410*b* may thus extend through hollow portions of the insulator 430 and the weld pad 450. The insulator 430 may thus be positioned between the base 10 and the weld pad 450 and circumferentially surround the second level 410*b* of the base 10.

The weld pad 450 may be ring-shaped with rounded corners connecting straight edges and a hollow center. The weld pad 450 may be formed of a metal such as, for example, nickel, steel, Kovar, or Niobium. Dimensions of the weld pad 450 may be equal to dimensions of the insulator 430 (e.g., the first length 435, the second length 437, the first width 431, and the second width 433). Alternatively, dimensions of the weld pad 450 may be proportionally greater than dimensions of the insulator 430. For example, the weld pad 450 may retain ring-like structures where a width of a first leg corresponding to the first leg 432 of the insulator 430 is less than a second width of a third leg corresponding to the third leg 436 of the insulator 430.

The weld pad 450 may include a ninth leg 452 opposite an eleventh leg 456, and a tenth leg 454 opposite a twelfth leg 458. The ninth leg 452 may have a ninth width 451 and the eleventh leg 456 may have a tenth width 453 greater than the ninth width 451. The ninth leg 452 and the eleventh leg 456 may have the first length 435, and the tenth leg 454 and the twelfth leg 458 may the second length 437. The weld pad 450 may include weld features along each of the ninth leg 452, the tenth leg 454, the eleventh leg 456, and the twelfth leg 458 to which a focusing element may be welded, as shown in FIG. 5. Each weld feature may extend a height greater than a fifth height 448 of the weld pad 450.

As briefly described above, the weld pad 450 may include a pocket cover with which the integral convex outer surface of the insulator 430 may mate. For example, the pocket cover may be a second part of the metal cup pocket within which the unitary convex wave shapes of the first braze foil 420, the second braze foil 440, and the insulator 430 may fit. The weld pad 450 may include a first pocket cover 459*a* and a second pocket cover 459*b* on the weld features of the tenth leg 454 and the twelfth leg 458, respectively. For example, the first pocket cover 459*a* and the first pocket base 406*a* may form a first pocket with which the first curve 439*a* of the insulator 430 may mate. The first pocket cover 459*a* and the second pocket cover 459*b* may be equivalent in size, shape, and placement along a respective leg. Each of the first pocket cover 459*a* and the second pocket cover 459*b* may be seamlessly integrated with the tenth leg 454 and the twelfth leg 458, respectively, where the weld pad 450 is manufactured as a single piece including the first pocket cover 459*a* and the second pocket cover 459*b*. Details of the first pocket cover 459*a* will be described herein for brevity, and may also be applicable to the second pocket cover 459*b*.

The first pocket cover 459*a* may have a unitary convex shape centered along the second length 437 of the tenth leg 454. The unitary convex shape may include a ninth width 455, which may be less than or equal to the eighth width 403 of the first pocket base 406*a*, and greater than the third width 402 of the first curve 439*a*. The ninth width 455 may be curvedly coupled to the tenth leg 454, thus forming the unitary convex shape. Additionally, the first pocket cover 459*a* may include a lip extending towards the insulator 430 with a sixth height 457, which may be greater than a seventh height 461 of the first pocket cover 459*a*. When the weld pad 450 is positioned on top of the second braze foil 440, which has positioned beneath it the insulator 430, the first braze foil 420, and the base 10 in the order shown in FIG. 4, the first pocket cover 459*a* may rest on the first curve 439*a*, which may rest on the first pocket base 406*a*. Thus, the first curve 439*a* may be partially enclosed by the lip of the first pocket base 406*a* from below and partially enclosed by the lip of the first pocket cover 459*a* from above, as further shown and described in reference to FIG. 5.

The ring-like structures of the first braze foil 420, the insulator 430, the second braze foil 440, and the weld pad 450 may allow the second level 410*b* of the base 10 to protrude through the centers of the second braze foil 440, the insulator 430, and the first braze foil 420. The insulator 430 may thus circumferentially surround the second level 410*b* of the base 10. In one example, the top of the second level 410*b* may be flush with the top of the second braze foil 440. In another example, the second level 410*b* may extend through the weld pad 450, as further shown in FIG. 5.

Each of the weld pad 450, the base 10, the first braze foil 420, the second braze foil 440, and the insulator 430 may be manufactured by the same party or by different parties. Further, the weld pad 450, the base 10, the first braze foil 420, the second braze foil 440, and the insulator 430 may be brazed together using torch brazing, induction brazing, resistance brazing, or another brazing method wherein the weld pad 450, the base 10, and the insulator are joined by a filler metal (e.g., the first braze foil 420 and the second braze foil 440). For example, the first braze foil 420 and the second braze foil 440 may be used to couple the insulator to the base 10 and weld pad 450 via brazing, FIG. 5 shows a cross-sectional view 500 of the cathode 400 of FIG. 4, as defined by a lateral cut taken along a dashed line 5-5 in FIG. 4. Like components are numbered similarly as in FIG. 3 and include the base 10, the insulator 430, and the weld pad 450. The embodiment shown in FIG. 5 further includes a focusing element 575. A set of reference axes 501 are provided for comparison between views shown, indicating an x-axis, a y-axis, and a z-axis.

The focusing element 575 may be a single continuous architecture with at least one channel sized such that a thermionic filament may be positioned therein, and with at least one focusing feature on either lateral side of the at least one channel. In one example, the focusing element 575 may be machined using EDM and five-axis mill machining. Focusing features and channels of the focusing element may have rounded corners and edges and smooth geometry, as opposed to corners which meet at a linear angle. Other methods may be used to machine the focusing element which allow for rounded edges and smooth geometry.

As shown in FIG. 5, the focusing element 575 may be configured as a continuous single architecture (e.g., a monolithic structure) gridding electrode with electron emitting filaments positioned in each of at least three channels with geometry to focus emitted electrons into a single electron beam. The focusing element 575 may have a bowl shape, e.g., the sides of the focusing element may have a taller height compared to a center of the focusing element.

The focusing element geometry may include a first lateral edge feature 502 and a second lateral edge feature 504 on opposite ends of a sixth length 519. Each of the first lateral edge feature 502 and the second lateral edge feature 504 may be configured with a lateral recess 506, which may assist in focusing the electron beam. Edges of the lateral recess 506 may be rounded. The focusing element 575 may further include at least one thermionic filament positioned in a channel of the focusing element architecture. The embodiment of FIG. 5 includes a small filament positioned in a first channel, a medium filament positioned in a second channel, and a large filament positioned in a third channel. In other embodiments, filaments may be of the same or different sizes. Further, filaments may each be positioned at a different height within a respective channel with respect to a top of the second level 410*b* of the base 10. Each filament may be positioned approximately at the center of the respective channel with regards to the channel width. Additional focusing features, such as a first focusing feature 528 and a second focusing feature 530, may be positioned between each of the channels along the sixth length 519 of the focusing element 575. Each of the first focusing feature 528 and the second focusing feature 530 may be configured with a geometry to focus the electrons emitted from the filaments on either side into the single electron beam for the focusing element 575. The channels may thus be spaced apart by a width of the focusing features between the respective channels.

Each of the filament of the first channel, the filament of the second channel, and the filament of the third channel may have an unequal lateral spacing with regards to adjacent filaments, wherein lateral spacing is defined as a lateral distance, with regards to a horizontal axis (e.g., the x-axis), between a center point of a first filament diameter to a center point of a second filament diameter. By positioning a middle filament to the left of a center point of the focusing feature, potential degradation of the filament may be prevented.

The focusing element 575 may be configured with a hollow space 532 below the plane of the filaments, through which insulated legs of the filaments may pass. As the filaments are charged with a voltage via current feedthroughs to heat the filament and emit electrons, the legs of each filament may be insulated, for example, by leg insulators, to minimize charge lost to the environment and isolate a current feedthrough charge from a charge imparted on the focusing element 575, a first charge of the base 10 and a second charge of the weld pad 450.

The hollow region provides a gap region between the focusing element 575 and the top of the second level 410*b* of the base 10. Further, due to the third length 415 of the second level 410*b* of the base 10 being less than the first length 435 of the insulator 430 and the weld pad 450, and less than the sixth length 519 of the focusing element 575, the gap region extends around sides of the second level 410*b* of the base 10. A lateral gap 540 is thus present between the second level 410*b* of the base 10 and the insulator 430, the second level 410*b* and the weld pad 450, and second level 410*b* and the focusing element 575 (e.g., around a circumference of the second level 410*b*). A width of the lateral gap 540 between the second level 410*b* and the weld pad 450 is equal to a width of the lateral gap 540 between the insulator 430 and the second level 410*b*. The lateral gap 540 may have a first width of equal distance around a circumference of the second level 410*b*. The lateral gap 540 may be rounded between second level 410*b* and the focusing element 575, such that a width of the lateral gap 540 between the second level 410*b* and the focusing element 575 is less than the width of the lateral gap 540 between the insulator 430 and the second level 410*b*.

As described in FIG. 4, the base 10 and the weld pad 450 may be configured with pocket bases and pocket covers, respectively, which may form metal cup pockets within which integral convex surfaces on the insulator 430 may sit. A first metal cup pocket may be formed of the first pocket cover 459*a* and the first pocket base 406*a*, and a second metal cup pocket may be formed of the second pocket cover 459*b* and the second pocket base 406*b*. Structures of the first metal cup pocket and the second metal cup pocket may thus be equivalent in size and shape. The first curve 439*a* may fit within the first metal cup pocket, the second curve 439*b* may fit within the second metal cup pocket, as shown in FIG. 5.

Heights 510 include the fourth height 407, the second height 408, the first height 428, the sixth height 457, and the seventh height 461. Widths 520 include the third width 402, the eighth width 403, the seventh width 422, and ninth width 455. When assembled, the cathode 400 includes the weld pad 450 positioned on top of and in face sharing contact with the insulator 430 and the insulator 430 positioned on top of and in face sharing contact with the base 10. As described in FIG. 4, the first braze foil 420 and the second braze foil 440 may be positioned on either side of the insulator 430 (e.g., between the base 10 and the insulator 430 and between the insulator 430 and the weld pad 450, respectively). Heights of each of the first braze foil 420 and the second braze foil 440 may be substantially thin and may therefore not be shown in FIG. 5. A height of a cathode base (e.g., the weld pad 450, first braze foil 420, the insulator 430, the second braze foil 440 and the weld pad 450) may thus be a sum of the second height 408, the first height 428, and the seventh height 461.

As previously described, the first pocket cover 459*a* and the second pocket cover 459*b* each have a lip which may extend towards the base 10 and thus partially surround the insulator 430. For example, the first pocket cover 459*a* may have a first lip 515*a* and the second pocket cover 459*b* may have a second lip 515*b*. Each of the first lip 515*a* and the second lip 515*b* may have the sixth height 457 which is greater than the seventh height 461 (e.g., of the remainder of the respective pocket cover structure). A top of each respective lip (e.g., proximate to the focusing element 575) may be aligned with a top of the weld pad 450.

The first pocket base 406*a* and the second pocket base 406*b* may have a third lip 515*c* and a fourth lip 515*d*, respectively. Each of the third lip 515*c* and the fourth lip 515*d* may have the fourth height 407 which is greater than the second height 408 (e.g., of the first level 410*a* of the base 10). A bottom of each respective lip (e.g., distal from the focusing element 575) may be aligned with a bottom of the base 10.

Further, each of the first lip 515*a*, the second lip 515*b*, the third lip 515*c*, and the fourth lip 515*d* may extend a lateral distance outward from a center of the cathode 400 (e.g., as shown by a center axis 535). For example, the third lip 515*c* may have the eighth width 403, which, when summed with the seventh width 422 may extend the total width of the base 10 at the first pocket base 406*a* to be greater than the seventh width 422 and greater than the third width 402, thus partially encompassing the insulator 430. Similarly to the first lip 515*a*, the third lip 515*c* may extend the fourth height 407 of the of the base 10 to be greater than the second height 408 of first level 410*a* the base 10. Thus, a distance 517 between the respective lip of the pocket cover and pocket base of each of the first metal cup pocket and the second metal cup pocket may be less than the first height 428 of the insulator 430.

In this way, a cathode for an X-ray imaging system may be fabricated, wherein cathode elements including each of the base, the first braze foil, the insulator, the second braze foil, and the weld pad may be aligned and mated without use of locating dowels and locating holes and/or cutouts within which to position the locating dowels. Stress points of the insulator may thus be reduced, and a useable life of the cathode may be increased. The cathode may thus have increased reliability and X-ray beam emission performance. The technical effect of a cathode for an imaging system as described herein is increased electron focusing ability of the cathode, high-voltage stability of the cathode, and increased yield of manufactured cathodes.

The disclosure also provides support for a cathode for an x-ray device, comprising: a cup, and a ceramic insulator having a convex outer surface mating with corresponding pockets on the cup surrounding the ceramic insulator. In a first example of the system, the cup comprises metal, and wherein the ceramic insulator has only a center opening and through-holes or external recess with at least 90 degrees of circular curvature. In a second example of the system, optionally including the first example, the ceramic insulator has a substantially rectangular shape with curved edges and wherein the center opening is a rectangular cutout with curved inner edges in a center of the ceramic insulator. In a third example of the system, optionally including one or both of the first and second examples, the ceramic insulator has a first leg opposite a third leg and a second leg opposite a fourth leg, wherein the first leg has a first width, the third leg has a second width greater than the first width, and the first leg and the third leg have a first length and the second leg and the fourth leg have a second length, where the first length is greater than the second length. In a fourth example of the system, optionally including one or more or each of the first through third examples, the convex outer surface includes a first curved surface and a second curved surface on the second leg and the fourth leg, respectively. In a fifth example of the system, optionally including one or more or each of the first through fourth examples, the first curved surface is positioned at a center of the second length. In a sixth example of the system, optionally including one or more or each of the first through fifth examples, the first curved surface has a unitary convex wave shape with a third width at a center point and a fourth width on either side of the third width along the second length. In a seventh example of the system, optionally including one or more or each of the first through sixth examples, the third width is greater than the first width and the fourth width is less than the first width. In an eighth example of the system, optionally including one or more or each of the first through seventh examples, the cathode further includes a first braze foil proximate to a first face of the ceramic insulator and a second braze foil proximate to a second face of the ceramic insulator, the first face opposite the second face. In a ninth example of the system, optionally including one or more or each of the first through eighth examples, the first braze foil and the second braze foil each have curves equivalent to the first curved surface and the second curved surface of the convex outer surface of the ceramic insulator. In a tenth example of the system, optionally including one or more or each of the first through ninth examples, the cup includes a base proximate to the first face of the ceramic insulator and a weld pad proximate to the second face of the ceramic insulator. In an eleventh example of the system, optionally including one or more or each of the first through tenth examples, the base has a fifth leg opposite a seventh leg and a sixth leg opposite an eighth leg, wherein the fifth leg, the sixth leg, and the eighth leg have a fifth width, the seventh leg has a sixth width greater than the fifth width, and the fifth leg and the seventh leg have a third length and the sixth leg and the eighth leg have a fourth length, where the third length is greater than the fourth length. In a twelfth example of the system, optionally including one or more or each of the first through eleventh examples, the base includes a lower extension along a fifth length of the seventh leg for coupling the cathode to an x-ray tube of the x-ray device. In a thirteenth example of the system, optionally including one or more or each of the first through twelfth examples, the base includes a pocket base on each of the sixth leg and the eighth leg, where a first pocket base on the sixth leg is in vertical alignment with the first curved surface on the second leg of the ceramic insulator and a second pocket base on the eighth leg is in vertical alignment with the second curved surface on the fourth leg of the ceramic insulator. In a fourteenth example of the system, optionally including one or more or each of the first through thirteenth examples, the first pocket base and the second pocket base are equivalent.

The disclosure also provides support for a cathode assembly for an x-ray device, comprising: a cathode cup configured to focus an electron beam on an anode assembly, a shield configured to shield components of the cathode assembly from backscatter electrons, a mask enclosing electrical leads, a cup formed by a weld pad and a base, and a ceramic insulator having a convex outer surface mating with corresponding pockets on the cup surrounding the ceramic insulator. In a first example of the system, the system further comprises: a first braze foil proximate to a first face of the ceramic insulator and a second braze foil proximate to a second face of the ceramic insulator, the first face opposite the second face, and the first braze foil and the second braze foil having convex outer surfaces which mate with the convex outer surface of the ceramic insulator.

The disclosure also provides support for an imaging system, comprising: a collector assembly, an anode assembly, and a cathode assembly configured to focus an electron beam on the anode assembly, wherein the cathode assembly includes a cup and a ceramic insulator having a convex outer surface mating with corresponding pockets on the cup surrounding the ceramic insulator. In a first example of the system, the collector assembly includes a window through which x-rays generated by the anode assembly are emitted, and an electron collector for absorbing backscatter electrons within the imaging system. In a second example of the system, optionally including the first example, the anode assembly includes at least one target on which the electron beam is focused, a rotor, and a bearing arm.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A cathode for an x-ray device, comprising:

a cup; and a ceramic insulator having a convex outer surface mating with corresponding pockets on the cup surrounding the ceramic insulator, wherein the ceramic insulator has a substantially rectangular shape with curved edges, the convex outer surface located on a leg of the substantially rectangular shape.

2. The cathode of claim 1, wherein the cup comprises metal, and wherein the ceramic insulator has only a center opening and through-holes or external recess with at least 90 degrees of circular curvature.

3. The cathode of claim 2, wherein the center opening is a rectangular cutout with curved inner edges in a center of the ceramic insulator.

4. The cathode of claim 2, wherein the ceramic insulator has a first leg opposite a third leg and a second leg opposite a fourth leg; wherein the first leg has a first width, the third leg has a second width greater than the first width; and the first leg and the third leg have a first length and the second leg and the fourth leg have a second length, where the first length is greater than the second length.

5. The cathode of claim 4, wherein the convex outer surface includes a first curved surface and a second curved surface on the second leg and the fourth leg, respectively.

6. The cathode of claim 5, wherein the first curved surface is positioned at a center of the second length.

7. The cathode of claim 5, wherein the first curved surface has a unitary convex wave shape with a third width at a center point and a fourth width on either side of the third width along the second length.

8. The cathode of claim 7, wherein the third width is greater than the first width and the fourth width is less than the first width.

9. The cathode of claim 5, wherein the cathode further includes a first braze foil proximate to a first face of the ceramic insulator and a second braze foil proximate to a second face of the ceramic insulator, the first face opposite the second face.

10. The cathode of claim 9, wherein the first braze foil and the second braze foil each have curves equivalent to the first curved surface and the second curved surface of the convex outer surface of the ceramic insulator.

11. The cathode of claim 9, wherein the cup includes a base proximate to the first face of the ceramic insulator and a weld pad proximate to the second face of the ceramic insulator.

12. The cathode of claim 11, wherein the base has a fifth leg opposite a seventh leg and a sixth leg opposite an eighth leg; wherein the fifth leg, the sixth leg, and the eighth leg have a fifth width, the seventh leg has a sixth width greater than the fifth width; and the fifth leg and the seventh leg have a third length and the sixth leg and the eighth leg have a fourth length, where the third length is greater than the fourth length.

13. The cathode of claim 12, wherein the base includes a lower extension along a fifth length of the seventh leg for coupling the cathode to an x-ray tube of the x-ray device.

14. The cathode of claim 12, wherein the base includes a pocket base on each of the sixth leg and the eighth leg, where a first pocket base on the sixth leg is in vertical alignment with the first curved surface on the second leg of the ceramic insulator and a second pocket base on the eighth leg is in vertical alignment with the second curved surface on the fourth leg of the ceramic insulator.

15. The cathode of claim 14, wherein the first pocket base and the second pocket base are equivalent.

16. A cathode assembly for an x-ray device, comprising:
- a cathode cup configured to focus an electron beam on an anode assembly;
- a shield configured to shield components of the cathode assembly from backscatter electrons;
- a mask enclosing electrical leads;
- a cup formed by a weld pad and a base; and
- a ceramic insulator having a convex outer surface mating with corresponding pockets on the cup surrounding the ceramic insulator.

17. The cathode assembly of claim 16, further comprising a first braze foil proximate to a first face of the ceramic insulator and a second braze foil proximate to a second face of the ceramic insulator, the first face opposite the second face, and the first braze foil and the second braze foil having convex outer surfaces which mate with the convex outer surface of the ceramic insulator.

18. An imaging system, comprising:
- a collector assembly;
- an anode assembly; and
- a cathode assembly configured to focus an electron beam on the anode assembly, wherein the cathode assembly includes a cup and a ceramic insulator having a convex outer surface mating with corresponding pockets on the cup surrounding the ceramic insulator,
- wherein the ceramic insulator has a substantially rectangular shape with curved edges, and the convex outer surface is located on a leg of the substantially rectangular shape.

19. The imaging system of claim 18, wherein the collector assembly includes a window through which x-rays generated by the anode assembly are emitted, and an electron collector for absorbing backscatter electrons within the imaging system.

20. The imaging system of claim 18, wherein the anode assembly includes at least one target on which the electron beam is focused, a rotor, and a bearing arm.

* * * * *